United States Patent [19]
Griffioen

[11] Patent Number: 5,197,715
[45] Date of Patent: Mar. 30, 1993

[54] METHOD FOR PULLING PLUG FOR INSTALLING A CABLE IN A CABLE CONDUIT

[75] Inventor: Willem Griffioen, Ter Aar, Netherlands

[73] Assignee: Koninklijke PTT Nederland N.V., Groningen, Netherlands

[21] Appl. No.: 924,373

[22] Filed: Jul. 31, 1992

Related U.S. Application Data

[63] Continuation of Ser. No. 659,825, Feb. 22, 1991, abandoned.

[30] Foreign Application Priority Data

Feb. 27, 1990 [NL] Netherlands .................... 9000462

[51] Int. Cl.⁵ ............................................. B65H 59/00
[52] U.S. Cl. .................................................... 254/134.4
[58] Field of Search ................ 254/1, 134.4, 134.3 R, 254/134.3 FT

[56] References Cited

U.S. PATENT DOCUMENTS

| | | | |
|---|---|---|---|
| 4,185,809 | 1/1980 | Jonnes | 254/134.4 |
| 4,733,850 | 3/1988 | Thompson | 254/134.4 |
| 4,830,538 | 5/1989 | Ueda | 254/134.4 |
| 4,934,662 | 6/1990 | Griffioen | 254/134.4 |

FOREIGN PATENT DOCUMENTS

| | | |
|---|---|---|
| 0108590 | 5/1984 | European Pat. Off. . |
| 0152720 | 8/1985 | European Pat. Off. . |
| 0221481 | 5/1987 | European Pat. Off. . |
| 0251129 | 1/1988 | European Pat. Off. . |
| 0264767 | 4/1988 | European Pat. Off. . |
| 0287225 | 10/1988 | European Pat. Off. . |
| 0292037 | 11/1988 | European Pat. Off. . |
| 3220286A1 | 12/1983 | Fed. Rep. of Germany . |
| 3616627A1 | 11/1987 | Fed. Rep. of Germany . |

OTHER PUBLICATIONS

"The Installation of Conventional Fiber-Optic Cables in Conduits Using the Viscous Flow of Air", by Willem Griffioen, Feb. 1989, IEEE, pp. 297–302.

*Primary Examiner*—J. J. Swann
*Attorney, Agent, or Firm*—Frishauf, Holtz, Goodman & Woodward

[57] ABSTRACT

An improved method for installing a cable (4) in a tubular cable conduit (6) with the aid of the drag forces of a flowing medium by applying additional tensile forces by a partially leaky pulling plug (10) coupled to the foremost end (8) of the cable and a partially leaky pulling plug for carrying out the improved method. The plug is provided with a suitably dimensioned flow opening (12) for allowing the flow through of the flowing medium in a manner not reducing the drag forces considerably, however with a certain pressure difference (Px—Px') across the plug (10). This pressure difference imparts thrust to the plug. The thrust of the plug exerts additional tensile forces on the foremost end (8) of the cable. Preferably the plug has a circumferential suction seal with the inside wall (11) of the conduit (6), and the flow opening is dimensioned such that during installation the flow velocity in the flow opening is essentially equal to that of sound in the flowing medium. The flow opening (12) may be fixedly chosen or may vary in a pressure-dependent manner.

12 Claims, 2 Drawing Sheets

METHOD FOR PULLING PLUG FOR INSTALLING A CABLE IN A CABLE CONDUIT

This application is a continuation of application Ser. No. 659,825, filed Feb. 22, 1991, now abandoned.

BACKGROUND OF THE INVENTION

1. Field of the Invention

The invention is in the field of installing a cable in a tubular cable conduit. More particularly, the invention comprises an improved method for installing a cable in a cable conduit with the aid of the drag forces of a flowing medium and a pulling plug which can be used in such a method.

2. Discussion of Background

References [3], [4] and [5] disclose first type installation methods with which a cable can be installed in a conduit with the aid of drag forces exerted on the cable by a medium, such as compressed air, flowing concurrently and rapidly. In this case, where the cable is fed into the pressurised space from the ambient pressure, a pressure difference occurs. According to this known technique, this pressure difference is compensated for near the place where it occurs by feeding the cable into the pressurised space with mechanical (references [3] and [5]) or hydrodynamic (reference [4]) means. From reference [5] it is, in addition, furthermore known to subject cables having a certain stiffness to an additional pushing force near the conduit entrance in order to compensate for a deficiency of drag forces in an initial part of the conduit, as a result of which larger installation lengths can be achieved in one fell swoop. The advantage of these known methods of the first type is that the drag forces exerted on the cable and having the effect of tensile forces are in general sufficiently equally distributed over the entire length of the cable. Nevertheless it has been found that installation is sometimes fairly suddenly hampered by upsetting or buckling. This appears to occur, inter alia, in the case of somewhat stiff cables which may have so-called intrinsic curvatures, that is to say they have the tendency to move in a curved manner, especially at the position of the foremost cable end. This results in an increased friction between cable and inside wall of the conduit and increases the risk of upsetting during the installation process. In a second type of known methods for the installation of cables in cable conduits, a tensile force is generally exerted on the foremost end of the cable. This can be achieved, for example, with a winching wire introduced beforehand into the conduit and attached to the cable end, as known from reference [1], or with the aid of a pulling plug attached to the cable end, which plug provides, in the conduit, a suction seal to the conduit and is energised with compressed air supplied from the feed-in end of the conduit, as known from reference [2]. Installation methods of this second type have the advantage that, by their nature, they do not suffer from the buckling effect, while, in addition, the foremost cable end is always guided in the right direction. In addition, a pulling plug energised by compressed air has the advantage of an implicit pressure drop compensation at the conduit feed-in end. It is true that these ways of installation have the disadvantage that, as a consequence of the cable tension present, the tensile force required may start to increase rapidly in the bends and undulations virtually always present in the cable conduit. This forms, in general, the limitation of the length of a cable to be installed in one piece in this way. A combination of the principles of both types of installation methods which could eliminate the disadvantages of each type separately and could possibly result themselves in an improved method with which still greater installation lengths could be achieved in one fell swoop is not readily possible. In such a combination, a winching device at the conduit removal end requires additional protective measures against the stream of air flowing out at high velocity and, in addition, a good coordination with the cable feed equipment at the conduit feed-in end. In addition it is necessary, as an additional step, for a winching wire to be introduced into the conduit beforehand from the conduit feed-in end. The known pulling plugs energised with compressed air, which have to seal the duct as well as possible for a satisfactory operation, render a flow of air of any significance along the cable impossible in principle.

SUMMARY OF THE INVENTION

The object of the invention is to provide an installation method for installing a cable in a cable conduit, which method achieves said combination and, in addition, furthermore enables the exertion of additional pushing forces at the conduit feed-in end. A method for installing a cable in a conduit with the aid of drag forces of a medium which flows rapidly along the cable in the conduit and which is fed from a feed-in end through the conduit to a removal end has for this purpose, according to the invention, the characteristic that tensile forces which also act on the cable in its longitudinal direction and which are applied to the foremost end of the cable in the conduit are exerted on the cable. Preferably, this is achieved in the method according to the invention by generating the tensile forces with the aid of a pulling plug which is partially leaky with respect to the flowing medium and which is coupled in a tension-proof manner to said foremost end. The object of the invention is furthermore to provide a pulling plug which is suitable for use in installation techniques described above but does not have the said disadvantages.

A pulling plug for the purpose of installing a cable in a conduit with the aid of drag forces of a medium flowing rapidly along the cable in the conduit, and which is provided with coupling means with which a tension-proof coupling to a foremost end of a cable to be installed can be achieved is characterised, according to the invention, in that it is furthermore provided with a flow opening having a flow capacity which allows a flow of said medium along the part of the cable already introduced into the conduit during installation, which flow has a flow velocity such that said drag forces are exerted on said part of the cable, and with sealing means which, during said flow, permit an energisation of the pulling plug such that said energisation results in tensile forces, which act on the foremost end of the cable in the conduit and which are able to interact with the said drag forces. Reference [6] does in fact disclose an installation method which uses a pulling plug energised with compressed air, and in which the degree of sealing with the inside wall of the conduit can vary as the result of the presence of an inflatable body in a manner such that said sealing increases as the pulling plug delivers a greater tensile force to the cable.

It has been found experimentally that a pulling plug which does not adjoin the conduit inside wall circumferentially completely in a suction manner has to have, if it is not always to jam as a result of variations in the inside diameter of the conduit, a diameter which is so much smaller than the said inside diameter that only very low tensile forces can be delivered to the foremost end of the cable with the compressed air energisation. Preferably, the sealing means are therefore such that, with said energisation, they are able to bring about and maintain a circumferential suction seal with the inside wall of the conduit.

Moreover, a pulling plug which seals well with respect to the conduit and which has a comparatively—i.e. with respect to the conduit cross-section—small hole as flow opening in the pulling plug was already found, experimentally, to result in a powerful air flow along the cable, including its associated drag action distributed over the length of the cable. Said opening is, however, subject to limits. On the one hand, the hole has to be large enough to allow through sufficient air flow to maintain the drag action on the cable and, on the other hand, the hole must at the same time not be too large in order to leave sufficient tensile force over at the foremost end of the cable. In a preferred embodiment, the flow opening is for this purpose accurately matched beforehand to the installation parameters such as working pressure and the conduit and cable parameters. In another preferred embodiment, the pulling plug is provided with pressure-dependent adjustment means which vary the size of the flow opening during installation. Further preferred embodiments of both the method and the pulling plug according to the invention are summarised in the other sub claims.

REFERENCES

[1] European Patent Publication Ep 0,152,720 entitled: Dispositif de commande d'un transporteur intermédiaire (Control device of an intermediate transporter);
[2] European Patent Publication EP 0,251,129 entitled: Verfahren und Vorrichtung zum Einziehen von Kabel, insbesondere von Glasfaserkabel in ein Rohr (Method and device for pulling cable, in particular glass fibre cable into a tube);
[3] European Patent Publication EP 0,108,590 entitled: Optical fibre transmission lines;
[4] European Patent Publication EP 0,287,225 entitled: Optical fibre installation;
[5] W. Griffioen, "The installation of conventional fiber-optic cables in conduits using the viscous flow of air", in Journal of Lightwave Technology, Vol. 7, No. 2, February 1989, pages 297-302;
[6] U.S. Pat. No. 4,648,744 entitled: Method and apparatus for positioning optical fibers in a buried conduit.

BRIEF DESCRIPTION OF THE DRAWING

The invention will be explained in greater detail with reference to a drawing, wherein.

DESCRIPTION OF EXEMPLARY EMBODIMENTS

Figure 1:
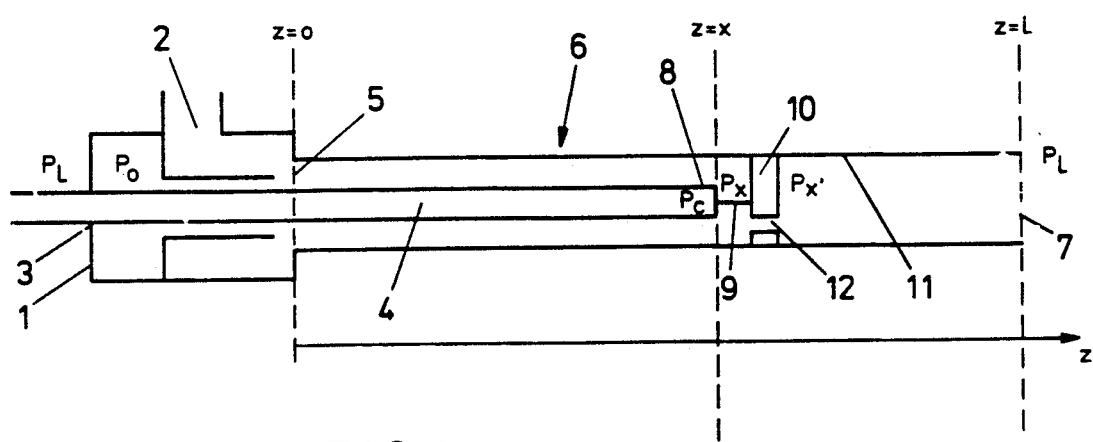
FIG. 1 shows a diagrammatic representation for the purpose of explaining in greater detail the cable installation method according to the invention.

For installing a cable in a conduit with the aid of drag forces exerted on the cable by air flowing rapidly along the cable, the variation dF of the force F exerted on the cable in the longitudinal direction of the conduit may be described by the following differential equation:

$$dF = \left[ f \cdot \sqrt{W^2 + (\theta_{EFF}/l \cdot F)^2 + \left(\frac{2a}{\pi^2 B} F^2\right)^2} - \frac{p_0^2 - p_1^2}{2lp(z)} \cdot \pi r_{CAB} r_{COND} \right] dz$$

In that equation, effects as a consequence of cable weight and cable tension, and of the buckling of the cable are correlated with effects as a consequence of the air flow. If a cable inherently has a certain stiffness, the additional friction which this produces between cable and conduit can be allowed for in the cable weight. With the aid of said equation, it is possible to calculate a theoretical maximum installation length for given specific installation parameters, a given method of pressure difference compensation and any additional pushing force at the conduit feed-in end. In practice, this maximum installation length was not always achieved. The following effect, at least concomitantly, was found to be responsible for this.

During installation, a somewhat stiff cable may exhibit intrinsic curvatures, which indicates that the cable has the tendency to pull in a bent manner. Such a tendency may be the consequence of the cable construction, but may also be the consequence of long-term storage in the bent state such as, for example, on a cable reel. Such intrinsic curvatures in the cable contribute to the friction between cable and conduit only at those points where the conduit opposes the aforesaid tendency and this is mainly the case at the ends of the cable in the conduit, when the cable is being pulled off a reel and the situation resembles a spiral wire being pulled under tension through a close fitting tube. At one end of the cable, that is at the conduit feed-in end, the effect of this contribution can be compensated for in a simple manner, for example simultaneously with the pressure difference compensation. An intrinsic curvature can, however, bring about in situ at the foremost end of the cable an additional contribution to the friction which, as a consequence of the fact that this intrinsic curvature is localised exclusively at the foremost end, cannot be compensated for by said drag forces. The effect of this additional contribution to the friction is the greatest when the foremost cable end has approached a critical point in the conduit, namely the point where the drag forces exerted on the cable by the flowing compressed air precisely compensate for (i.e. just overcome) the friction as a consequence of the cable weight, including the said small increase of that friction as a consequence of the stiffness which can be regarded as equivalent to an increment of weight so far as the friction effect is concerned. There is consequently an appreciably increased risk of "buckling" at that stage where dF=0 during the installation. The additional contribution to the friction at the foremost end of the cable as a consequence of an intrinsic curvature results in a force $F_{ic}$ which opposes the movement of the cable and which can be approximated well by:

$$F_{ic} = fB\{(3aR_c^3)^{\frac{1}{2}}\}^{-1} \quad (1)$$

Here:
$R_c$ = bending radius of an intrinsic cable curvature,
f = coefficient of friction between cable and conduit,
a = difference between the respective cross-sectional radii of the conduit and the cable,
B = stiffness of the cable.

According to the invention, the compressive force $F_{ic}$ is at least compensated for by exerting tensile forces on the foremost end of the cable, while the drag action of the air flowing along the cable in the conduit nevertheless essentially continues to be maintained. Said compensation is preferably a slight overcompensation in order to pass the critical point, where dF=0, more easily with a small additional tensile force. These features will be explained in more detail with the aid of FIG. 1. A cable feed-in unit 1 having a first feed-in opening 2 for compressed air and a second feed-in opening 3 for a cable 4 to be installed is coupled to a feed-in end 5 of a cable conduit 6. The conduit 6 has a length L. Compressed air and cable 4 move in a z direction from the feed-in end 5 at z=0 to a removal end 7 of the conduit 6 at z=L. In the conduit there is a z-dependent pressure. It is assumed that, in the cable feed-in unit 1, there is a pressure $P_o$ which is equal to that in the feed-in end 5 at z=0, and that, near the removal end 7 at z=L, there is a pressure $P_L$ which is equal to the external pressure which surrounds the feed-in unit 1. The surrounding pressure of the foremost end 8 of the cable 4 in the conduit 6 at the point to which (z=x) the cable has been conveyed at a particular instant during installation is indicated by $P_x$. When the cable 4 is introduced into the feed-in opening 3 of the feed-in unit 1, the cable experiences a pressure difference that results in an opposing force $F_{pd}$ which, in the known technique cited above, is overcome by mechanical or hydrodynamic means in the direct vicinity of the feed-in opening 3. Connected to the foremost end 8, by means of a coupling 9 with a high tensile strength is a pulling plug 10. Said pulling plug 10 makes suction contact circumferentially with the inside wall 11 of the conduit 6 and is furthermore provided with a flow opening 12, as a result of which it is partially leaky. The flow opening 12 is so dimensioned that, on the one hand, an air flow can take place, through said opening, which has a volume per unit time such that the flow velocity of the air along the cable is not appreciably reduced by the presence of the pulling plug 10, and that, on the other hand, a certain pressure difference $P_x - P_x'$ exists across the pulling plug, as a result of which the pulling plug is powered with thrust, resulting in a tensile force $F_p$ on the foremost end 8 of the cable which is at least large enough to compensate for the compressive force $F_{ic}$. In practice, a very usable partially leaky pulling plug is found to be obtained if, assuming an opening having an essentially circular cross-section, the radius $r_h$ thereof is determined from the following equation:

$$\Phi_v = 0.58 \cdot \pi r_h^2 P_o c_o \quad (2)$$

Here:
$\Phi_v$ = the estimated volumetric flow of the flowing medium in the conduit without cable, with given conduit and compressor parameters (as for Examples 1, 2 and 3 described below);
$r_h$ = radius of the flow opening 12;
$P_o$ = the pressure in the cable feed-in unit 1;
$c_o$ = the speed of sound in the flowing medium under atmospheric conditions.

That is to say, the size of the flow opening is chosen in a manner such that the shock wave condition of equation (2) above is fulfilled, which is to say that a pressure difference at which a shock wave is produced in the opening is able to exist in the conduit across the pulling plug, for a size of opening in accord with equation (2), at least to an approximation. The factor 0.58 indicates a pressure and temperature reduction in the opening which accompanies such a shock wave. The reason for this choice is that, in the case of a flow opening having a larger diameter, which yields a flow velocity in the flow opening lower than that at which a shock wave occurs, the air flow hardly experiences any friction and the pulling plug is therefore hardly powered with thrust. Starting from the shock wave condition, further reduction of the flow opening no longer yields a higher flow velocity but the volumetric flow $\Phi_v$ is limited and, consequently, also the drag force on the cable. A pulling plug having such a flow opening with a fixedly chosen radius $r_h$ will certainly fulfil said shock wave condition quite reasonably in the first section of the conduit where the pressure gradient is still low and still changes but little. If this is also to be the case in the rest of the conduit, the size of the flow opening will have to change, specifically in a manner such that, with decreasing pressure $P_x$, the radius $r_h$ of the flow opening increases.

EXAMPLE 1

If a standard long-distance cable (having weight W=1N/m, stiffness B=1Nm² and radius $r_{cab}$=5 mm) is installed in a conduit (having radius $r_{cond}$=13 mm, coefficient of friction f=0.2 (estimated)), which conduit exhibits undulations (having amplitude A=5 cm and periodicity P=5 m), with the aid of a compressor (having $P_o$=9 bar and $\Phi_v$=70 l/s) and mechanical feed-in means (having a deliverable pushing force of 100N), the calculated maximum installation length with a cable feed-in unit is 775 m (see reference [5]). If a cable has, in addition, also an intrinsic curvature (having a bending radius $R_c$=0.3 m), the calculated installation length drops to 690 m, a reduction of approximately 11%.

In field tests, such an impairment of the installation result has in fact been observed. Use of a partially leaky pulling plug can eliminate the said reduction in installation length completely. In addition, the cable feed-in unit is able to operate with a less powerful motor for pressure drop compensation and exerting additional pushing forces.

EXAMPLE 2

In a field test, an attempt has been made to blow a flexible cable (having weight W=0.12N/m, stiffness B<0.01Nm² and radius $r_{cab}$=1.5 mm) into a 400 m-long conduit (having radius $r_{cond}$=6 mm, coefficient of friction f=0.3 (estimated) and 16 right angle bends) with the aid of a compressor (having maximum $P_o$=8 bar and $\Phi_v$=10 l/s). Although the cable exhibited no intrinsic curvatures, it was not found to be possible to install the cable in the conduit because of buckling. No improvement was observed on using a pulling plug which sealed the conduit completely or just failed to seal it completely. If, however, a pulling plug suctionally sealing the conduit circumferentially and provided with a flow opening having a diameter of 2.6 mm which was determined with the aid of the shock wave condition of equation (2) was used, blowing-in proved to be very satisfactorily possible, whereas poorer results were again obtained in the event of deviations from the shock wave condition (diameters of 2.3 mm and 3.0 mm). All these features appear, however, to be in agreement with the theory according to reference [5]. For a completely flexible cable (that is to say $F_{ic}=0$), the latter results in a maximum installation length of 300 m under the above conditions. If, however, 5% of the blowing capacity, i.e. a pressure difference of 0.4 bar across the pulling plug, were used for a tensile force on the pulling plug, which amounts, in fact, to an overcompensation for $F_{ic}$, the calculated maximum installation length is 460 m.

EXAMPLE 3

In a field test, an attempt has been made to install a cable in a test section of 1000 m. The parameters of the cable and the conduit are as in Example 1. The cable conduit exhibited, however, fewer undulations and the cable did not have any appreciable intrinsic curvature. With the aid of a compressor ($P_o=9$ bar and $\Phi_v=70$ l/s) and mechanical feed-in means (with a deliverable pushing force of 100N), it was possible for the cable to be fed into the conduit only up to a cable length of 250 m. If a pulling plug having a constant flow opening of 7 mm, which approximately conforms to the shock wave condition, was used an installation length of 750 m was found to be achievable.

Of the three variants, to be described below, of the pulling plug according to the invention, the first is one having a constant flow opening, and the other two have pressure-regulated flow openings.

Three variants of a partially leaky pulling plug according to the invention are described with reference to FIG. 2, with subsections a, b and c. The base of these three variants is formed by a cylindrical hollow housing 21 provided with a thickened but rounded nose section 22. The outside of the end 23 of the cylindrical hollow housing 21 is provided with a screw thread 24. Attached around the housing 21 by means of clamping between rings 25 and sleeve pieces 26 and 27 are small washers 28, which are capable of bringing about a suction seal with the inside wall 11 (see FIG. 1) of a conduit 6 into which the pulling plug has to be fitted. At the same time, sleeve piece 27 can be screwed around the housing 21 by means of screw thread 24. Optionally, a connecting piece 30 as in subsection a), a connecting piece 40 as in subsection b) or a connecting piece 60 as in subsection c) of FIG. 2 can be screwed on the end 23 of the housing 21 adjoiningly to said sleeve piece 27. A very simple variant of the partially leaky pulling plug is the one having connecting piece 30. Said connecting piece 30 is a more or less tubular continuation 31 of the housing 21, which continuation 31 incorporates a hole 32, having a constant diameter, which determines the air flow rate for a given pressure difference. Attached to the end of said tubular continuation 31 is a pulling eye 33 to which a cable can be firmly coupled by a high tensile strength coupling. The diameter of the hole 32 has been determined, preferably, with the aid of equation (2). When during cable installation such a pulling plug, i.e. provided with the connecting piece 30, proceeds further into the duct, i.e. with increasing z (see FIG. 1), and the air pressure starts to decrease more markedly, the pressure difference across the pulling plug, and consequently the force acting on the pulling plug, will increase. Beyond the critical point, however, where $dF=0$, there is less need not only for overcompensation but even for compensation of the compressive force $F_{ic}$ as a consequence of the increasing drag action. In view of the fact that the tensile forces are at the expense of the drag forces as a consequence of the air flowing along the cable, it is desirable at least not to cause said tensile forces to increase in that section of the conduit, that is past $dF=0$, but preferably to cause them to decrease. This can be achieved if the size of the flow opening increases with decreasing pressure. Connecting pieces 40 and 60 have a variable flow opening of this type.

Figure 2A:
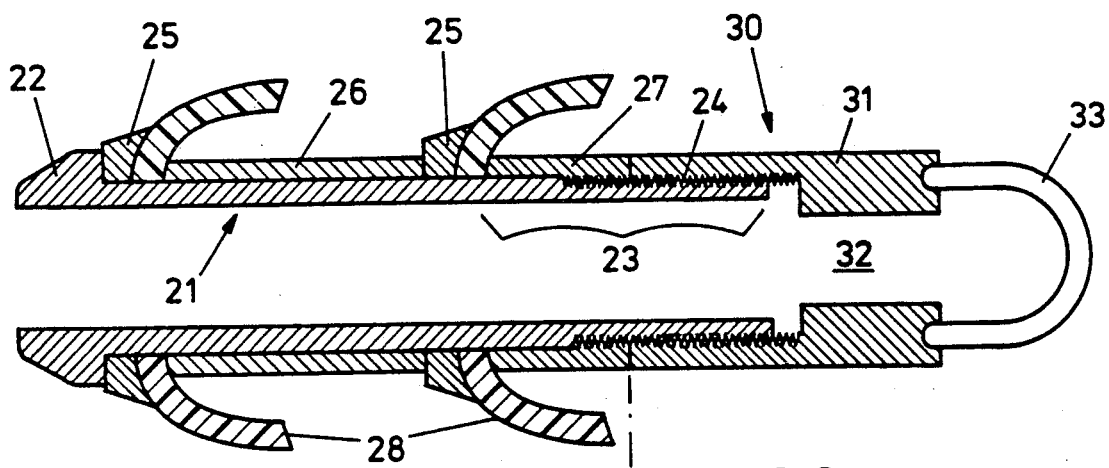
FIGS. 2a-2c show a pulling plug according to the invention:
  2a) housing and connecting piece of a first variant;
  2b) a connecting piece, connectable to the housing according to a), of a second variant;
  2c) the same for a third variant.
Figure 2B:
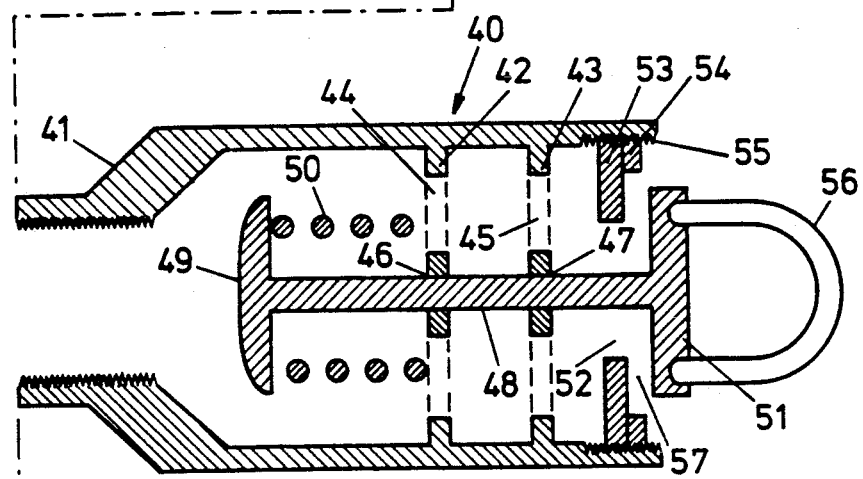
Figure 2C:
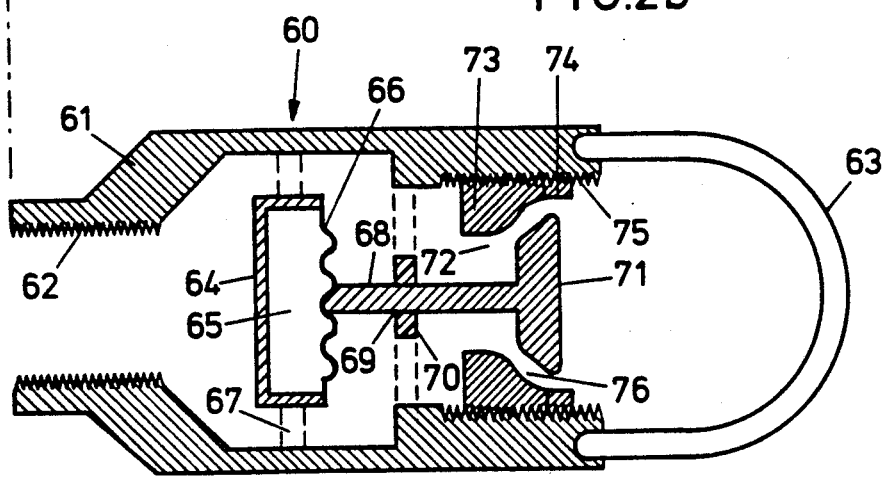

Connecting piece 40 in subsection b) of FIG. 2 comprises a more or less cylindrical housing 41 provided with partitions 42 and 43. Said partitions are provided with air passage openings 44 and 45 which can allow the air flow in the conduit to pass virtually unimpeded, and bores 46 and 47 through which a rod 48 can slide to and fro. At the side facing the housing 21, the end of the rod 48 is provided with a flange-like boundary 49 for a spring 50, which is provided around the rod 48 between said boundary 49 and the partition 42. Attached to the other end of the rod 48 is a disc-shaped valve 51. The rod 48 projects between the partition 43 and the valve 51 through an opening 52 of an adjustment ring 53 which can be locked with a retaining ring 54. The diameter of the opening 52 of the adjustment ring 53 is smaller than that of the valve 51. Both adjustment ring 53 and retaining ring 54 are fitted so as to screw along a screw thread 55 on the inside wall of the housing 41. A pulling eye 56 for a coupling of high tensile strength to a cable to be installed is attached to the valve 51. The space between the valve 51 and the adjustment ring 53, termed air passage 57, determines the air flow in this variant. With a particular energisation of this pulling plug by an air flow in the conduit, an equilibrium is established between the tensile force on the cable delivered by the pulling plug and the force which the spring 50 delivers. Under these circumstances, the air passage 57 has adjusted itself to a certain size. If the energisation of the pulling plug as a result of the air flow becomes greater, which corresponds to an increase in the difference in pressure on either side of the air passage 57, the size of the air passage 57 increases, but the extent of the energisation will decrease again as a result. A new equilibrium will be established. The size of said air passage 57 is so adjusted that, at the beginning of the installation path, the shock wave condition for a constant opening is fulfilled according to equation (2). In this connection, the characteristics of the spring 50 are such that the shock wave condition is fulfilled even for $P_x$. In this second variant, the construction is such that the valve 51 increases the air passage 57 in opposition to the spring pressure of the spring 50. Obviously, a construction is also possible in which the air passage 57 is decreased in opposition to a spring pressure, the pulling eye 56 then no longer being attached to the valve but to the housing 41.

The pulling plug according to the second variant will deliver over the entire length of the conduit a tensile force which, if not constant, is nevertheless adequately levelled off.

Connecting piece 60 as shown in subsection c) of FIG. 2 also has a more or less cylindrical housing 61 which is provided, at the inside of one end of it, with a screw thread 62 fitting around the end 23 of the housing 21, and to which a pulling eye 63 is attached at the other end of it. A cylindrical drum 64 provided with a pressure chamber 65 and a membrane 66 is mounted coaxially in the cylindrical housing 61 and is kept in its place with the by rigid struts or plates 67 fixed on the inside wall of the housing 61. The distance of said drum 64 from the inside wall of the housing 61, and the dimensions of said rigid connections 67, are such that the remaining flow openings do not determine the air flow. The membrane 66 is coupled to an end of a rod 68 which is able to slide to and fro through an opening 69 in a dividing plate 70 provided in the housing 61. The rod 68 is essentially coaxial with the cylindrical housing 61. Attached to the other end of the rod 68 is a disc-shaped valve 71. The dividing plate 70 is provided with large flow openings such that these do not determine the air flow. Between the dividing plate 70 and the valve 71, the rod 68 projects through an opening 72 in an adjustment ring 73 which can be locked with a retaining ring 74. The diameter of the opening 72 of the adjustment ring 73 is smaller than that of the valve 71. Both adjustment ring 73 and retaining ring 74 can be screwed along a screw thread 75 which is provided on the inside wall of the housing 61. The space between the valve 71 and the adjustment ring 73, termed air passage 76, determines the air flow in this variant. The size of the air passage 76 is so adjusted that, for an existing pressure $P_o$, that is to say at the beginning of the installation path, the shock wave condition of equation (2) is fulfilled as well as possible. The membrane 66 has, under these circumstances, a certain degree of pressing-in. As the pulling plug proceeds farther into the conduit during installation and the air pressure decreases, the membrane 66 will be less pressed in and the valve 71 will open further via the rod 68. As a result of this, the air passage 76 is increased and the tensile force of the pulling plug 10 on the cable 4 (see FIG. 1) will decrease. Valve 71 and adjustment ring 73 may be provided with a surface profile at the position of the air passage 76. As a result of suitable choice of said profile and of the deformability properties of the membrane 66, a tensile force, on a cable 4, which depends in a desired manner on the pressure existing locally in the conduit 6 can be achieved with a pulling plug provided with the connecting piece 60. This is, for example, such that the tensile force remains constant over the entire length of the conduit, or else that it decreases slowly as the cable is fed further into the conduit. With suitable choice of the membrane, in this variant the pulling eye 63 can also be attached to the valve 71.

I claim:

1. A method of installing a cable into a conduit with the aid of drag forces of a fluid medium which is inserted at the feed-in end of the conduit and which flows rapidly along the cable to a removal end of the conduit, comprising the steps of:
   connecting to an end of said cable, by means of a coupling of high tensile strength, a leaky pulling plug of a design permitting said fluid medium to leak therethrough with creation of a pressure difference between forward and rear faces of said pulling plug during said rapid flow of said fluid medium;
   inserting said leaking pulling plug and said forward cable end into said feed-in end of said conduit, and
   pulling said cable into said conduit by generating a rapid flow of said fluid medium from said feed-in end of said conduit along said cable through said leaky plug and out through said removal end of said conduit, while thereby exerting said drag forces on the cable in the conduit and exerting tensile force on said cable end as a consequence of said pressure difference at said pulling plug, which tensile force assists said drag forces and inhibits buckling of the cable.

2. The method according to claim 1, wherein said fluid medium which is caused to flow rapidly in said conduit in the step of pulling said cable into said conduit is a gaseous medium.

3. The method according to claim 2, in which said leaky pulling plug which is connected through a coupling of high tensile strength to an end of said cable has a leak, the leaking effect of which varies as a function of pressure.

4. The method according to claim 3, wherein the variation of leaking effect of said leak of said pulling plug varies as a function of pressure difference existing across the pulling plug in a manner, and to an extent, such that the tensile force exerted on the forward end of the cable is at least approximately constant during the step of pulling said cable into said conduit by generating a rapid flow of said fluid medium from said feed-in cable through said leaky plug and out through said removal end of said conduit.

5. The method according to claim 3, wherein said leaky plug has a leak effectiveness which varies as a function of the pressure existing in the immediate vicinity of the pulling plug in such a manner and to such an extent that the tensile force exerted on the forward end of the cable during the pulling step does not increase, from a value which it has in an initial stage of the pulling step, when said pressure increases.

6. The method of claim 2, wherein the leakiness effect of said leaky plug used in the pulling step is produced by a round aperture connecting the forward and rear sides of said plug which at least approximately fulfills, by its radius and the fluid flow pressure at the rear end of said plug, the condition for the presence of a shock wave as set forth in equation (2) hereof.

7. A method for installing a cable in a conduit with the aid of drag forces of a medium which flows rapidly along the cable in the conduit and which is fed from a feed-in end through the duct to a removal end, with simultaneous exertion of pushing forces acting on the cable in the longitudinal direction of the cable near the feed-in end of the duct, comprising the steps of:
   connecting by means of a coupling of high tensile strength, to an end of said cable a leaky pulling plug, of a design permitting said fluid medium to leak therethrough with creation of a pressure difference between forward and rear faces of said pulling plug during rapid flow of said fluid medium,
   inserting said plug and said end of said cable into said conduit, and
   exerting said pushing forces on said cable and advancing said cable into and through said conduit and at the same time generating a rapid flow of said fluid medium from said feed-in end of said conduit along said cable through said leaky plug and out through said removal end of said conduit, whereby a thrust force is exerted on said leaky plug by said flow which continually flows through said plug, which assists said pushing forces and inhibits buckling of the cable.

8. The method according to claim 7, wherein said fluid medium which is caused to flow in said conduit in the step of advancing said cable into said conduit is a gaseous medium.

9. The method according to claim 8, in which said leaky pulling plug which is connected through a coupling of highy tensile strength to an end of said cable has a leak, the leaking effect of which varies as a function of pressure.

10. The method according to claim 9, wherein the variation of leaking effect of said leak of said leaky pulling plug varies as a function of pressure difference existing across the pulling plug in a manner, and to an extent, such that the tensile force exerted on said end of said cable is at least approximately constant during the sept of advancing said cable into and through said conduit and at the same time generating a rapid flow of said fluid medium along said cable and through said leaky plug.

11. The method according to claim 9, wherein said leaky plug which is connected in the initial step of the method has a leak effectiveness which varies as a function of the pressure existing in the immediate vicinity of the leaky pulling plug in such a manner and to such an extent that the tensile force exerted on said end of said cable during the step of advancing said cable does not increase, when said pressure increases, from a value which said tensile force has in an initial stage of the step of advancing said cable.

12. The method of claim 9, wherein the leakiness effect of said leaky plug connected to said end of said cable is produced by a round aperture connecting the forward and rear sides of said plug which at least approximately fulfills, by its radius and the fluid flow pressure at the rear end of said plug, the condition for presence of a shock wave as set forth in equation (2) hereof.

* * * * *